UNITED STATES PATENT OFFICE.

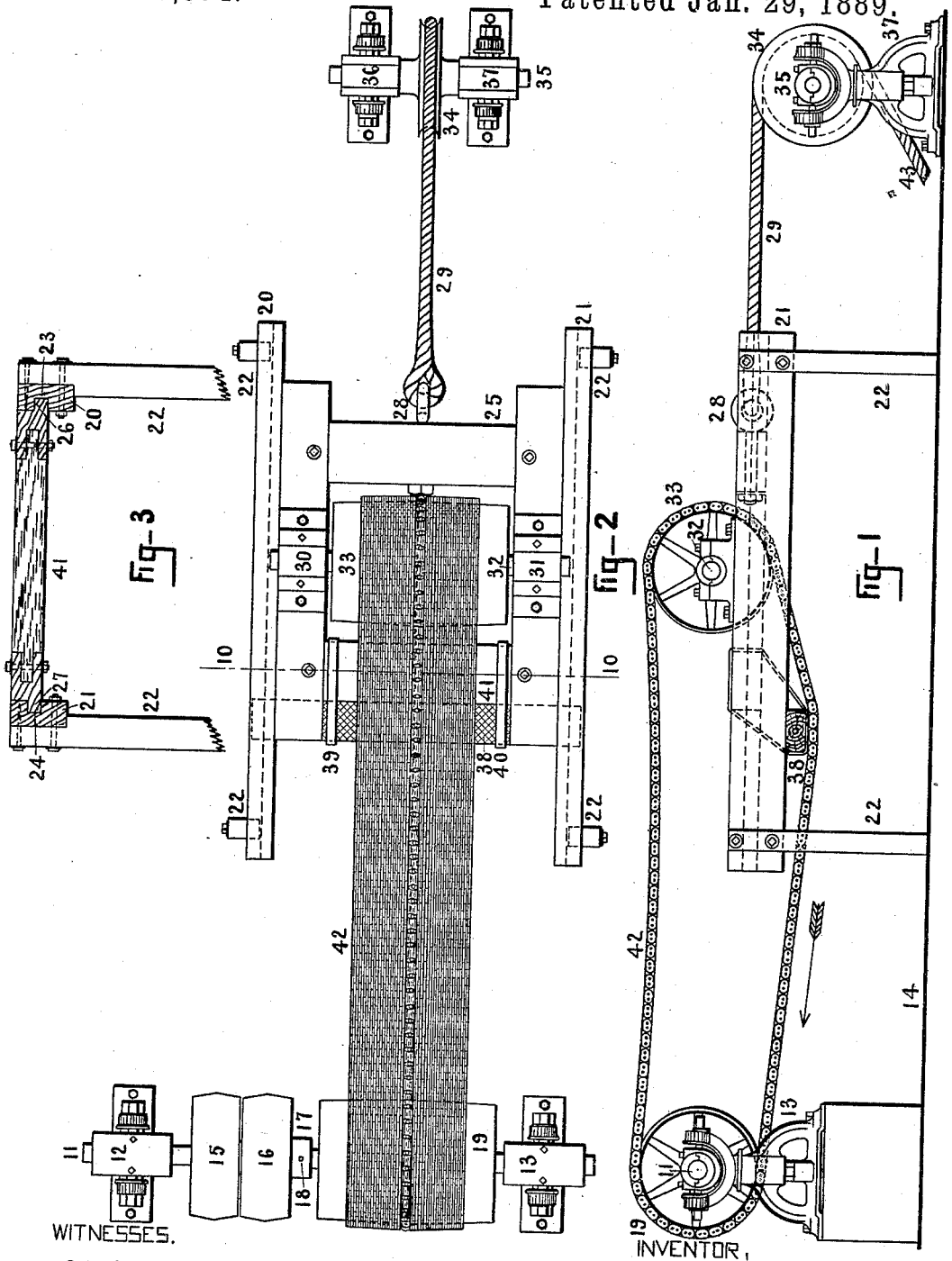

CHARLES L. IRESON, OF BOSTON, MASSACHUSETTS.

BELT-STRETCHING MACHINE.

SPECIFICATION forming part of Letters Patent No. 396,874, dated January 29, 1889.

Application filed April 23, 1888. Serial No. 271,621. (No model.)

*To all whom it may concern:*

Be it known that I, CHARLES L. IRESON, of Boston, in the county of Suffolk and State of Massachusetts, have invented certain new and useful Improvements in Leather-Link-Belt Stretching and Surfacing Machines, of which the following, taken in connection with the accompanying drawings, is a specification.

My invention relates to machines designed to be used in the stretching and surfacing of leather-link belting made of links of leather or other similar material; and it has for object the production of a machine that will stretch and surface link-belts in an efficient and economical manner.

Figure 1 represents the machine in side elevation, and Fig. 2 is a plan of Fig. 1. Fig. 3 is a sectional view on line 10 10 of Fig. 2.

The driving-shaft 11 is mounted in the hangers 12 and 13, which are securely bolted to the floor. (Represented in Fig. 1 by line 14.) The driving-shaft is provided with the following: tight pulley 15, which is fastened to shaft; loose pulley 16, which is held sidewise upon the shaft by means of hub of tight pulley on one side and loose-pulley collar 17 on the other side, which is secured to shaft by means of set-screw 18, and driving-pulley 19, which is fastened to shaft, and is driven by means of power conveyed by means of a belt to tight pulley and transmitted to driving-pulley 19 by means of driving-shaft. The side rails, 20 and 21, are provided with supports 22, which are securely fastened to the floor, and to which are bolted the rails 20 and 21, which are respectively provided with the ways 23 and 24.

The sliding carriage 25, constructed as represented, is provided with the following: longitudinal tongues 26 and 27, which are made to fit and slide within the ways 23 and 24, respectively; eyebolt 28, adapted to receive tension-rope 29, and pedestal-boxes 30 and 31, in which is mounted the driven shaft 32, to which is fastened the driven pulley 33. The rope guide-pulley 34 is secured to shaft 35, which is mounted in hangers 36 and 37. The hangers are bolted to the floor 14. The surfacing-stick 38, the central portion of which is covered with sand-paper or other suitable abrading material for a length equal to the width of the face of the driven pulley, is held against the under side of the rails by means of the leather straps or loops 39 and 40, which pass around the stick and the front piece, 41, of the sliding carriage. All the parts being made of suitable material—preferably as follows: sliding carriage, rails, and supports of wood; all other parts of iron—they are assembled as represented and as follows:

The center lines of all the shafts are parallel one with the other, and the center lines of all the pulleys are in the same line. The center lines of driving and driven shafts are preferably in the same horizontal plane. The driven pulley is opposite the driving-pulley, and the guide-pulley is so located that the center line of the tension-rope from the top of guide-pulley to the eyebolt will be parallel to the line of motion of the sliding carriage. In practice the length of the rails is about forty feet, and the faces of the driving and driven pulleys are of such a width as will receive the widest link-belt it is desired to stretch and surface.

The operation of the machine is as follows: The link-belt 42, as represented, is placed in its position over the driving and driven pulleys, and is there riveted together to form an endless belt. Then by the application of power applied in any suitable manner to the portion 43 of the tension-rope, preferably by means of a tackle, the sliding carriage is pulled toward the rope-guide pulley until the link-belt is subjected to a sufficient stretching-tension. Then the rope is hitched or fastened. Then the surfacing-stick is placed in its position within the loops and between the link-belt and rails. Then, by the application of power applied to the driving-shaft, the driving-pulley is rotated, thereby driving the link-belt around the driving and driven pulleys in the direction as indicated by an arrow, Fig. 1; and while the belt is being so driven under tension it is stretched and surfaced.

All link-belts stretch to some considerable extent when first used; and the object of my machine is to thoroughly stretch the belts before putting them in practical operation, thereby saving or preventing many annoyances which are caused by belts not being properly stretched.

Link-belts have, when made of leather links, a fibrous and an uneven surface, and the object of surfacing the belt is to obtain a better contact-surface.

The processes of stretching and surfacing may be carried on at the same time or at different times, and a rotating surfacing-wheel may be substituted, if desired, for the surfacing-stick.

In the use of my machine very little hand-labor is necessary, and when the machine is started in operation it may be left running without any special attendance until the stretching and surfacing processes are completed, thereby reducing the cost of manufacture of link-belts.

The machine can be made at a low cost and can be easily and economically operated.

What I claim as new, and desire to secure by Letters Patent, is—

1. Pulley 19, rails 20 and 21, provided with ways, sliding carriage 25, provided with tongues 26 and 27, and pulley 33, in combination with means designed to slide said carriage in said ways, substantially as described.

2. Pulley 19, rails 20 and 21, provided with ways, sliding carriage 25, provided with tongues 26 and 27, pulley 33, and surfacing-stick 38, in combination with means designed to slide said carriage in said ways, substantially as described.

In testimony whereof I have signed my name to this specification, in the presence of two subscribing witnesses, on this 18th day of April, A. D. 1888.

CHARLES L. IRESON.

Witnesses:
E. FRANK. WOODBURY,
J. L. BAILEY.